: US 8,848,634 B2
: Sep. 30, 2014

(12) United States Patent
Kogure et al.

(10) Patent No.: US 8,848,634 B2
(45) Date of Patent: Sep. 30, 2014

(54) BASE STATION APPARATUS, RADIO COMMUNICATION SYSTEM, CONTROL METHOD OF BASE STATION, AND CONTROL METHOD OF RADIO COMMUNICATION SYSTEM

(75) Inventors: Yuki Kogure, Tokyo (JP); Takahiro Nobukiyo, Tokyo (JP)

(73) Assignee: NEC Corporation, Tokyo (JP)

( * ) Notice: Subject to any disclaimer, the term of this patent is extended or adjusted under 35 U.S.C. 154(b) by 230 days.

(21) Appl. No.: 13/258,911

(22) PCT Filed: Mar. 16, 2010

(86) PCT No.: PCT/JP2010/001869
§ 371 (c)(1),
(2), (4) Date: Sep. 22, 2011

(87) PCT Pub. No.: WO2010/125737
PCT Pub. Date: Nov. 4, 2010

(65) Prior Publication Data
US 2012/0039205 A1    Feb. 16, 2012

(30) Foreign Application Priority Data
Apr. 28, 2009  (JP) ................. 2009-108960

(51) Int. Cl.
*H04W 72/04*    (2009.01)
*H04W 52/36*    (2009.01)
*H04W 52/28*    (2009.01)

(52) U.S. Cl.
CPC .......... *H04W 52/367* (2013.01); *H04W 52/281* (2013.01)
USPC .......................................... 370/329; 370/252

(58) Field of Classification Search
CPC ..... H04W 24/00; H04W 80/04; H04W 84/12; H04W 88/06; H04W 84/18; H04W 72/04; H04W 88/08; H04W 52/46; H04W 36/30; H04W 36/24; H04B 17/003; H04B 5/14; H04B 7/18543; H04B 7/2628; H04B 2201/70701; H04B 2201/707
USPC ................. 370/210, 252, 281, 318, 328–329, 370/331–333, 335; 455/436; 375/295
See application file for complete search history.

(56) References Cited

U.S. PATENT DOCUMENTS

| 2004/0192308 | A1* | 9/2004 | Lee et al. ....................... 455/436 |
| 2005/0286409 | A1* | 12/2005 | Yoon et al. .................... 370/210 |
| 2009/0190546 | A1* | 7/2009 | Makino ......................... 370/329 |
| 2009/0245191 | A1* | 10/2009 | Ball et al. ...................... 370/329 |
| 2011/0013723 | A1* | 1/2011 | Suga et al. .................... 375/295 |
| 2012/0263061 | A1* | 10/2012 | Reial et al. .................... 370/252 |

FOREIGN PATENT DOCUMENTS

| JP | 2004215276 A | 7/2004 |
| JP | 2006527547 A | 11/2006 |
| JP | 2008529444 A | 7/2008 |
| WO | 2007034552 A | 3/2007 |

OTHER PUBLICATIONS

International Search Report for PCT/JP2010/001869 mailed Apr. 27, 2010.
3GPP TS 36.101 V8.4.0, "3rd Generation Partnership Project; Technical Specification Group Radio Access Network; Evolved Universal Terrestrial Radio Access (E-UTRA); User Equipment (UE) radio transmission and reception (Release 8)", Dec. 2008.
3GPP TS 36.213 V8.5.0, "3rd Generation Partnership Project; Technical Specification Group Radio Access Network; Evolved Universal Terrestrial Radio Access (E-UTRA); Physical layer procedures (Release 8)", Dec. 2008.
3GPP TS 36.321 V8.4.0, "3rd Generation Partnership Project; Technical Specification Group Radio Access Network; Evolved Universal Terrestrial Radio Access (E-UTRA); Medium Access Control (MAC) protocol specification (Release 8)", Dec. 2008.

* cited by examiner

*Primary Examiner* — Kwang B Yao
*Assistant Examiner* — Syed M Bokhari (74) *Attorney, Agent, or Firm* — Sughrue Mion, PLLC (57) ABSTRACT

One object of the present invention is to make a base station detect inconsistency between an uplink maximum transmission power P_CMAX actually set by a mobile station, and a maximum transmission power P_EMAX allowed by the base station for the mobile station without making the mobile station report to the base station about a transmission power upper-limit value P_UMAX associated with a power class of the mobile station. A base station (10) determines inconsistency between a set value P_CMAX of a maximum transmission power which a mobile station (13) actually imposes on itself and an index value P_RMAX of the maximum transmission power used in the base station (10) for scheduling a radio resource carrying an uplink signal. This determination is performed based on at least one of reception quality of the uplink signal, a radio modulation scheme applied to the uplink signal, and notification information from the mobile station (13) included in the uplink signal (except a transmission power upper-limit value P_UMAX).

18 Claims, 8 Drawing Sheets

BASE STATION APPARATUS, RADIO COMMUNICATION SYSTEM, CONTROL METHOD OF BASE STATION, AND CONTROL METHOD OF RADIO COMMUNICATION SYSTEM

TECHNICAL FIELD

The present invention relates to management of radio resources used to transmit an uplink signal from a mobile station to a base station.

BACKGROUND ART

A Long Term Evolution (LTE) is a cellular communication system that is considered in a 3rd generation partnership project (3GPP) as a successor of a W-CDMA. An LTE network is also called an evolved universal terrestrial radio access network (E-UTRAN).

Uplink radio resources in the LTE are allocated by dividing a plurality of resource blocks (RBs) to a plurality of mobile stations. The resource block is a resource element in which a frequency domain is divided in a unit of 180 kHz (12 subcarriers, each interval between subcarriers being 15 kHz), and a time domain is divided in a unit of 1 milliseconds. Note that the allocation control of the resource blocks is called "scheduling".

The scheduling of the uplink radio resources is performed by a base station. The base station measures reception quality of a reference signal (SRS: Sounding Reference Signal) transmitted from the mobile station, and determines, based on this reception quality, the number of resource blocks, hopping patterns, radio modulation scheme (QPSK, 16 QAM or 64 QAM), and the like allocated to a physical uplink shared channel (PUSCH) used by each mobile station to transmit user data.

The transmission power of PUSCH depends on the maximum transmission power of the mobile station and the number of resource blocks that are allocated. Thus, the base station notifies the mobile station of allowable maximum transmission power P_EMAX in advance, and performs scheduling of the uplink radio resources in consideration of the maximum transmission power P_EMAX notified to the mobile station. The mobile station receives the result of scheduling performed by the base station, and transmits the uplink signal using the resource block specified by the base station.

The transmission power when the mobile station transmits the PUSCH is determined based on the number of resource blocks (frequency band) allocated to the PUSCH, the magnitude of the path loss of the downlink estimated by the mobile station, and the like. The total transmission power of the mobile station is controlled so as not to exceed a maximum transmission power P_CMAX imposed on the mobile station. The mobile station sets smaller one between the allowable maximum transmission power P_EMAX notified from the base station and a transmission power upper-limit value P_UMAX associated with a power class of the mobile station as the maximum transmission power P_CMAX.

See specifications of the 3GPP listed as Non-patent literatures 1 to 3 for more details of the scheduling of the uplink radio resources and the uplink transmission power control in the LTE described above. Specifically, Non-patent literature 1 includes the inclusive specifications regarding the mobile station of the LTE system. In particular, it includes the specification of the power class of the mobile station, and the specification of the transmission power upper-limit value P_UMAX for each power class. Further, Non-patent literature 1 specifies that smaller one between the maximum transmission power P_EMAX allowed by an upper layer and the transmission power upper-limit value P_UMAX corresponds to power class should be selected as the maximum transmission power P_CMAX actually set in the mobile station.

Non-patent literature 2 includes specifications regarding a physical layer of LTE. More specifically, it includes specifications regarding the uplink transmission power control such as a definition expression to determine the transmission power of PUSCH.

Non-patent literature 3 includes specifications regarding a transmission timing of a power headroom report (PHR) transmitted from a mobile station of LTE to a base station. "Power Headroom" is calculated as a difference between a maximum transmission power P_CMAX that is actually set in the mobile station and a current transmission power of the mobile station. In short, "Power Headroom" means the "transmission power margin" of the mobile station with respect to the maximum transmission power P_CMAX.

Further, Patent literature 1 discloses the following two points:
(i) a mobile station notifies a base station of a transmission power margin (i.e. power headroom); and
(ii) the base station performs scheduling of uplink radio resources in consideration of the transmission power margin notified from the mobile station.

Further, Patent literature 2 discloses the following points (i) to (v):
(i) a mobile station transmits a transmission power upper-limit value P_UMAX specified according to the power class of itself to a radio network controller (RNC) that manages uplink radio resources;
(ii) the RNC selects smaller one between a maximum allowable transmission power P_EMAX allowed for the mobile station and the transmission power upper-limit value P_UMAX received from the mobile station, thereby determining a maximum transmission power P_CMAX that is actually set by the mobile station;
(iii) the RNC notifies a base station of the maximum transmission power P_CMAX of the mobile station that is determined;
(iv) the mobile station transmits a transmission power margin (i.e. power headroom) to the base station; and
(v) the base station calculates a current transmission power of the mobile station using the transmission power margin received from the mobile station and the maximum transmission power P_CMAX of the mobile station received from the RNC, and performs scheduling of the uplink radio resources.

CITATION LIST

Patent Literature

Patent Literature 1
International Patent Publication No. WO 07/034552
Patent Literature 2
Published Japanese Translation of PCT International Publication for Patent Application, No. 2008-529444

Non Patent Literature

Non-Patent Literature 1
3GPP TS 36.101 V8.4.0, "3rd Generation Partnership Project; Technical Specification Group Radio Access Network; Evolved Universal Terrestrial Radio Access (E-UTRA); User Equipment (UE) radio transmission and reception (Release 8)", December, 2008

Non-Patent Literature 2

3GPP TS 36.213 V8.5.0, "3rd Generation Partnership Project; Technical Specification Group Radio Access Network; Evolved Universal Terrestrial Radio Access (E-UTRA); Physical layer procedures (Release 8)", December, 2008

Non-Patent literature 3

3GPP TS 36.321 V8.4.0, "3rd Generation Partnership Project; Technical Specification Group Radio Access Network; Evolved Universal Terrestrial Radio Access (E-UTRA); Medium Access Control (MAC) protocol specification (Release 8)", December, 2008

SUMMARY OF INVENTION

Technical Problem

The problem in the LTE is that the base station cannot recognize inconsistency occurred between the maximum transmission power P_CMAX allowed by the base station for the mobile station and the maximum transmission power P_CMAX actually set by the mobile station for itself. For example, when the maximum transmission power P_EMAX allowed by the base station for the mobile station is larger than the transmission power upper-limit value P_UMAX based on the power class of the mobile station, the maximum transmission power P_CMAX actually applied to the mobile station is set as P_UMAX. Accordingly, in this case, the maximum transmission output of the mobile station becomes smaller than that assumed in the base station. Thus, the base station may not be able to efficiently perform scheduling of the uplink radio resources. This is because there occur some problems that the transmission rate of the uplink signal from the mobile station becomes smaller than the expectation of the base station, or a part of the plurality of resource blocks allocated to the mobile station by the base station is not used.

The LTE system is not only the radio communication system in which these problems may occur. These problems may occur in a radio communication system that uses a base station or a base station controller that is configured to notify the mobile station of the allowable maximum transmission power P_EMAX and perform scheduling of the uplink radio resources using as an indicator the maximum transmission output P_CMAX notified by the base station itself.

According to the method disclosed in Patent literature 2, the base station controller receives the transmission power upper-limit value P_UMAX based on the power class from the mobile station, and compares the magnitude of the maximum transmission power P_EMAX allowed for the mobile station and that of the transmission power upper-limit value P_UMAX received from the mobile station, thereby can estimate the uplink maximum transmission power P_CMAX actually set by the mobile station in the side of the base station controller. This prevents the occurrence of inconsistency between the mobile station and the base station regarding the maximum transmission power of the mobile station. However, since the transmission power upper-limit value P_UMAX based on the power class needs to be reported from the mobile station to the RNC according to the method disclosed in Patent literature 2, an additional function needs to be provided to the mobile station.

The present invention has been made in view of the considerations mentioned above. One exemplary object of the present invention is to allow a base station to detect inconsistency between an uplink maximum transmission power P_CMAX actually set by a mobile station and a maximum transmission power P_EMAX allowed by the base station for the mobile station without making the mobile station report to the base station about a transmission power upper-limit value P_UMAX associated with the power class of the mobile station.

Solution to Problem

A first exemplary aspect of the present invention includes a base station apparatus that receives an uplink signal transmitted from a mobile station. The base station apparatus is configured to determine, based on at least one of reception quality of the uplink signal, a radio modulation scheme applied to the uplink signal, and notification information from the mobile station included in the uplink signal (except a transmission power upper-limit value associated with a power class of the mobile station), inconsistency between a set value of a maximum transmission power which the mobile station actually imposes on the mobile station itself and an index value which is related to the maximum transmission power of the mobile station and is used in the base station apparatus for scheduling of a radio resource carrying the uplink signal.

A second exemplary aspect of the present invention includes a radio communication system including a mobile station and a base station. The base station is configured to schedule a radio resource used to transmit an uplink signal from the mobile station and to receive the uplink signal transmitted according to the scheduling. Furthermore, the base station determines, based on at least one of reception quality of the uplink signal, a radio modulation scheme applied to the uplink signal, and notification information from the mobile station included in the uplink signal (except a transmission power upper-limit value associated with a power class of the mobile station), inconsistency between a set value of a maximum transmission power which the mobile station actually imposes on the mobile station itself and an index value which is related to the maximum transmission power of the mobile station and is used for the scheduling.

A third exemplary aspect of the present invention includes a control method of a base station apparatus that receives an uplink signal transmitted from a mobile station, including: determining, based on at least one of reception quality of the uplink signal, a radio modulation scheme applied to the uplink signal, and notification information from the mobile station included in the uplink signal (except a transmission power upper-limit value associated with a power class of the mobile station), inconsistency between a set value of a maximum transmission power which the mobile station actually imposes on the mobile station itself and an index value which is related to the maximum transmission power of the mobile station and is used in the base station apparatus for scheduling of a radio resource carrying the uplink signal.

A fourth exemplary aspect of the present invention includes a control method of a radio communication system, the method including the following steps (a) to (c):

(a) notifying a scheduling result of a radio resource used to carry an uplink signal to a mobile station from a base station;

(b) transmitting the uplink signal from the mobile station to the base station based on the scheduling result; and (c) determining, in the base station, based on at least one of reception quality of the uplink signal, a radio modulation scheme applied to the uplink signal, and notification information from the mobile station included in the uplink signal (except a transmission power upper-limit value associated with a power class of the mobile station), inconsistency between a set value of a maximum transmission power which the mobile station actually imposes on the mobile station itself and an index value which is related to the maximum transmission power of the mobile station and is used for the scheduling.

Advantageous Effects of Invention

According to each aspect of the present invention stated above, it is possible to allow a base station to detect inconsistency between an uplink maximum transmission power P_CMAX actually set by a mobile station and a maximum transmission power P_EMAX allowed by the base station for the mobile station without making the mobile station report to the base station about a transmission power upper-limit value P_UMAX associated with the power class of the mobile station.

DESCRIPTION OF EMBODIMENTS

In the following description, specific exemplary embodiments according to the present invention will be described in detail with reference to the drawings. Throughout the drawings, the same components are denoted by the same reference symbols, and overlapping description is omitted as appropriate for the sake of simplification.

First Exemplary Embodiment

Figure 1:
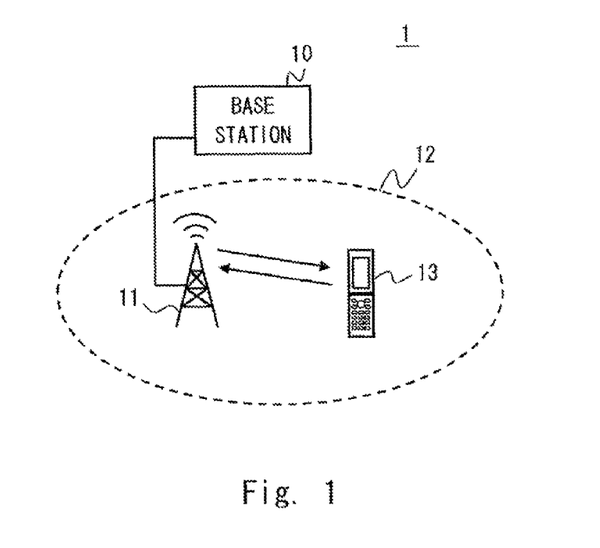
FIG. 1 is a diagram showing a configuration example of a radio communication system according to a first exemplary embodiment of the present invention.

In a first exemplary embodiment, a radio communication system and a base station of LTE type will be described. FIG. 1 is a network diagram showing a configuration example of a radio communication system 1 including a base station 10 according to the first exemplary embodiment. The base station 10 is connected to an antenna 11, and performs radio communication with a mobile station 13 located in a coverage area 12. The base station 10 performs allocation (i.e. scheduling) of radio resources used in radio communication lines (i.e. downlink and uplink) between the base station 10 and the mobile station 13. The base station 10 is further connected to a core network (not shown), and relays traffic between the mobile station 13 and the core network.

The LTE employs an orthogonal frequency division multiplexing access (OFDMA) for a downlink radio access system, and employs a single-carrier frequency-division multiple access (SC-F DMA) for an uplink radio access system.

In the downlink of the LTE, a physical downlink shared channel (PDSCH), a physical downlink control channel (PDCCH) and the like are used. The PDSCH is used to transfer user data. The PDCCH is used to transfer control information including user data information and transport format information according to downlink user data mapped to the PDSCH, and user data information and transport format information according to uplink user data mapped to the PUSCH.

Further, in the uplink of the LTE, the above-mentioned PUSCH for transmitting user data, a physical uplink control channel (PUCCH) and the like are used. The PUCCH is used to transfer quality information (CQI: Channel Quality Indicator) of downlink measured by the mobile station.

In the scheduling of the uplink signal, the base station 10 determines the number of resource blocks allocated to the PUSCH used for transmitting the user data by the mobile station 13, hopping patterns, a radio modulation scheme (QPSK, 16 QAM, or 64 QAM), and the like. The base station 10 uses an index value P_RMAX regarding a maximum transmission power of the mobile station 13 for the scheduling of the uplink signal. The initial value of the index value P_RMAX may be a maximum transmission power P_EMAX allowed by the base station 10 for the mobile station 13. However, as stated above, a maximum transmission power P_CMAX which the mobile station 13 actually imposes on the mobile station itself may be smaller than the maximum transmission power P_EMAX allowed by the base station 10. For example, when an upper-limit value P_UMAX of the transmission power based on the power class of the mobile station 13 is smaller than P_EMAX, the mobile station 13 sets the upper-limit value P_UMAX of the transmission power based on the power class as the maximum transmission power P_CMAX.

Thus, the base station 10 according to the first exemplary embodiment is configured to detect inconsistency between the index value P_RMAX used to schedule the uplink radio resources and the set value P_CMAX of the maximum transmission power which the mobile station 13 actually imposes on the mobile station itself. Although the detail will be described later, the base station 10 detects the inconsistency based on at least one of reception quality of the uplink signal, the radio modulation scheme employed in the uplink signal, and notification information from the mobile station 13 included in the uplink signal (except the trans-mission power upper-limit value P_UMAX associated with the power class of the mobile station 13). The notification information from the mobile station 13 includes, power headroom report (PHR), for example.

It is particularly important that transmission of the PHR by the mobile station 13 is specified in the specifications of the LTE, and no additional function is provided to the mobile station 13. Further, the reception quality of the uplink signal and the radio modulation scheme employed in the uplink signal can be autonomously measured in the base station 10 that receives the uplink signal, and no additional function needs to be provided to the mobile station 13 to detect inconsistency. For example, the reception quality of the uplink signal is (a) throughput of the uplink signal, (b) received power of the uplink signal in the base station 10, (c) received signal to interference ratio (SIR) of the uplink signal, (d) occupied bandwidth of the uplink signal, (e) the number of resource blocks used to carry the uplink signal, or (f) block error rate (BLER) obtained by decoding the uplink signal.

Described below are a configuration example of the base station 10, and some specific examples of a procedure for detecting inconsistency between the index value P_RMAX and the set value P_CMAX.

Figure 2:
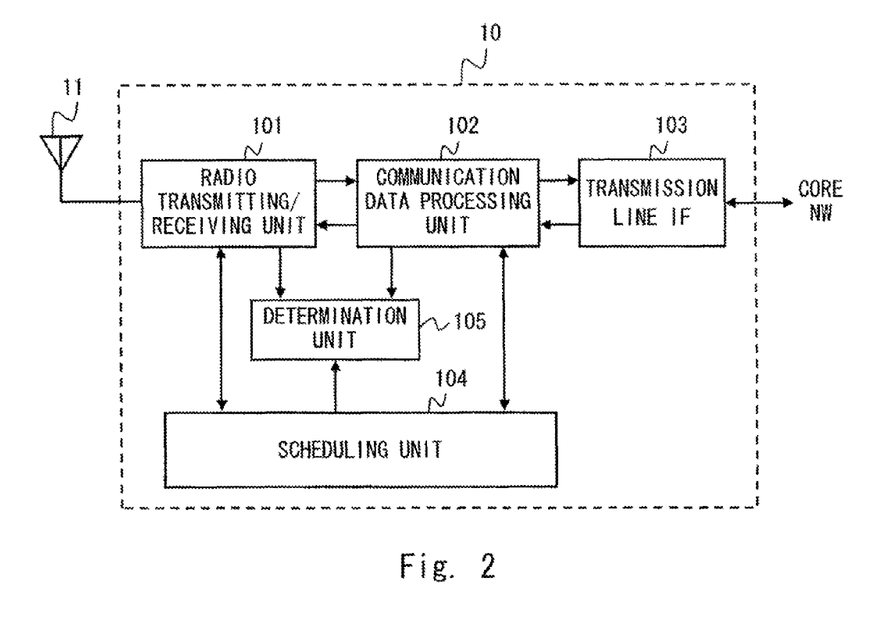
FIG. 2 is a block diagram showing a configuration example of a base station shown in FIG. 1.

FIG. 2 is a block diagram showing a configuration example of the base station 10. In FIG. 2, a radio transmitting/receiving unit 101 up-converts a downlink signal in a baseband frequency supplied from a communication data processing unit 102 to a radio frequency (RF), performs signal amplification on the up-converted signal, and supplies the signal to an antenna 11. Further, the radio transmitting/receiving unit 101 amplifies an uplink signal received by the antenna 11, performs frequency down-converting to the baseband, and supplies the uplink signal in a baseband frequency to the communication data processing unit 102.

The communication data processing unit 102 has layer 1 processing and layer 2 (medium access control (MAC)/radio link control (RLC)) processing functions. The communication data processing unit 102 receives packet data that is to be transmitted to downlink from a core network through a transmission line interface 103. The communication data processing unit 102 generates a downlink signal in a baseband frequency (baseband OSFM signal) by performing division and/or integration of the received packet data, transmission processing of the RLC layer such as RLC re-transmission control, MAC re-transmission control, hybrid automatic repeat request (HARQ) control, transport format selection, channel coding, symbol mapping, and OFDM modulation. Typically, inverse fast Fourier transform (IFFT) processing is used as the OFDM modulation.

Further, the communication data processing unit 102 restores the data sequence transmitted from the mobile station 13 by performing OFDM demodulation, error correction decoding, MAC re-transmission control, and reception processing of the RLC layer on the uplink signal received from the radio transmitting/receiving unit 101. Typically, fast Fourier transform (FFT) processing is used as the OFDM demodulation. The received data sequence that is restored is transferred to the core network through the transmission line interface 103.

A scheduling unit 104 performs scheduling of the uplink radio resources and the downlink radio resource. In the scheduling of the uplink radio resources, the transmission format and the number of resource blocks allocated to the mobile station 13 are determined according to uplink interference wave level acquired by the radio transmitting/receiving unit 101, reception quality (e.g., SIR) of the uplink reference signal (SRS: Sounding Reference Signal), power offset, and the like. Further, the transmission power of the uplink signal transmitted from the mobile station 13 is determined depending on the path loss and the number of resource blocks that are transmitted. Accordingly, the scheduling unit 104 allocates the uplink radio resources in consideration of the index value P_RMAX of the maximum transmission power of the mobile station 13, and the transmission power margin (remaining level of power) shown by the PHR received from the mobile station 13. The initial value of the index value P_RMAX is "allowable maximum transmission power P_EMAX" that is determined by the base station 10 and is notified to the mobile station 13.

A determination unit 105 determines inconsistency between the index value P_RMAX and the set value P_CMAX. As described above, the index value P_RMAX is the maximum transmission power (i.e. estimation value) of the mobile station 13 used by the scheduling unit 104 to schedule the uplink radio resources. On the other hand, the set value P_CMAX is the maximum transmission power actually set by the mobile station 13 for itself.

Figure 3:
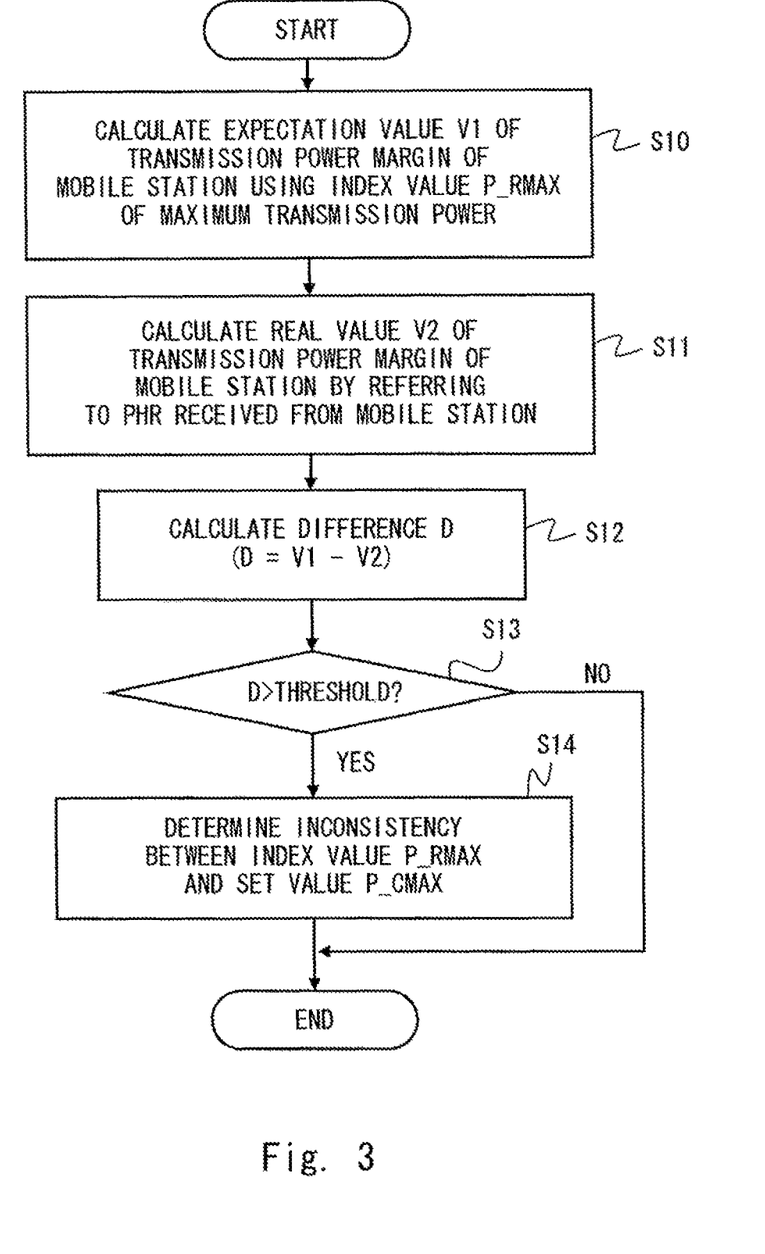
FIG. 3 is a flowchart showing one example of a procedure for determining inconsistency between a set value P_CMAX of a maximum transmission power of a mobile station and an index value P_RMAX for scheduling.

Described next are some examples for determining the inconsistency between the index value P_RMAX and the set value P_CMAX in the determination unit 105. At first, an example of detecting the inconsistency using the power headroom report (PHR) notified from the mobile station 13 will be described. FIG. 3 is a flowchart showing a specific example of a procedure for detecting inconsistency using the power headroom report (PHR).

In step S10, the determination unit 105 calculates an expectation value V1 of the transmission power margin of the mobile station 13 using the index value P_RMAX of the maximum transmission power and the result of scheduling the uplink radio resources. The calculation of the expectation value V1 may be performed as follows. For example, a difference obtained by subtracting the transmission power of the mobile station 13 expected from the number of resource blocks allocated to the mobile station 13 for uplink transmission from the index value P_RMAX may be set to an expectation value V1. A value obtained by subtracting the measurement value of the total received power in the frequency band allocated to the mobile station 13 for uplink transmission and the estimation value of the uplink path loss from the index value P_RMAX may be set to an expectation value V1. The path loss estimation value of uplink may be calculated using a difference between the transmission power of the downlink reference signal (RS) by the base station 10 and the received power of the RS reported from the mobile station, or the result of receiving the reference signal (SRS).

In step S11, the determination unit 105 refers to the PHR received from the mobile station 13, and calculates a real value V2 of the transmission power margin of the mobile station 13. Specifically, the value of the transmission power margin shown by the PHR may be set as the real value V2.

In steps S12 and S13, the inconsistency between the expectation value V1 and the expectation value V2 is determined. Specifically, in step S12, the determination unit 105 calculates the difference D by subtracting the real value V2 from the expectation value V1. The determination unit 105 compares the difference D with a threshold (step S13). The threshold is a positive value that is set in advance.

When the value of the difference D exceeds the threshold that is set in advance (YES in step S13), the determination unit 105 determines that there is inconsistency between the index value P_RMAX of the maximum transmission power for scheduling and the set value P_CMAX of the maximum transmission power that is actually set in the mobile station 13 (step S14).

Figure 4:
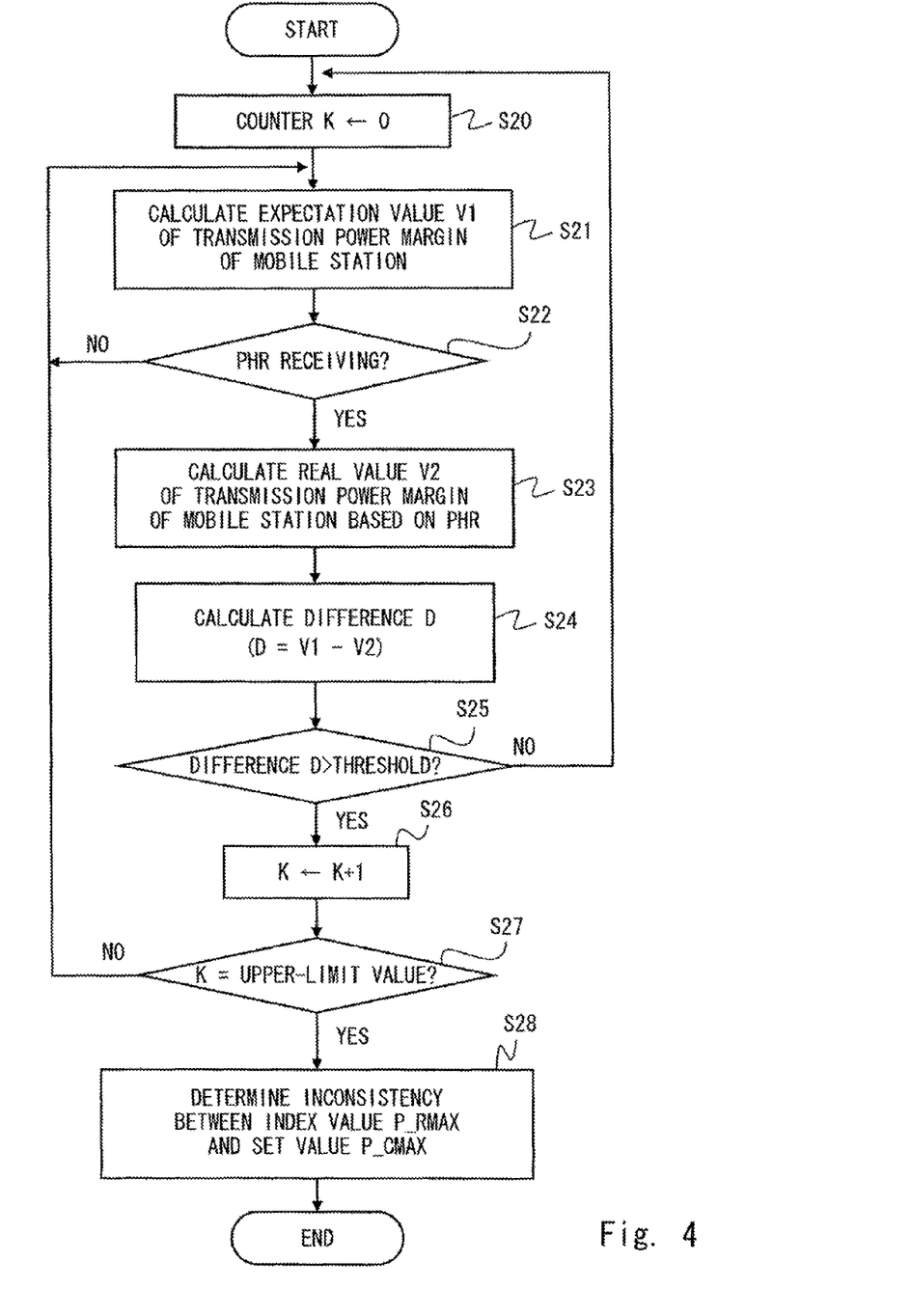
FIG. 4 is a flowchart showing one example of a procedure for determining inconsistency between a set value P_CMAX and an index value P_RMAX for scheduling of a maximum transmission power of a mobile station.

In order to avoid false determination, the following method may be used. The number of times that the difference D exceeds the threshold that is set in advance is counted. When the number of counts exceeds the reference times set in advance, it may be determined that there is inconsistency between the index value P_RMAX and the set value P_CMAX. FIG. 4 shows one example of a determination procedure varied in this way.

In step S20, the value of the counter K is reset to zero. In step S21, the determination unit 105 calculates the expectation value V1 of the transmission power margin of the mobile station 13. Step S21 is similar to step S10 described above. In step S22, it is determined whether PHR is received from the mobile station 13. When the PHR is received (YES in step S22), the determination unit 105 calculates, by referring to the PHR, the real value V2 of the transmission power margin of the mobile station 13 (step S23). Step S23 is similar to step S11 stated above. In steps S24 and S25, it is determined whether the condition for inconsistency is established between the expectation value V1 and the expectation value V2. Specifically, as is similar to steps S12 and S13, the determination unit 105 may calculate the difference D, and perform threshold determination for the difference D.

When the value of the difference D exceeds the threshold that is set in advance (YES in step S25), the determination unit 105 increments the value of the counter K by 1. Meanwhile, when the value of the difference D is equal to or lower than the threshold (NO in step S25), the determination unit 105 goes back to step S20, and resets the value of the counter K to zero.

In step S27, the determination unit 105 determines whether the value of the counter K reaches the upper-limit value that is set in advance. When the value of the counter K does not reach the upper-limit limit value, the process goes back to step S21 to repeat the processing. Meanwhile, when the value of the counter K reaches the upper-limit value (YES in step S27), the determination unit 105 determines that there is inconsistency between the index value P_RMAX and the set value P_CMAX (step S28).

In summary, according to the determination procedure shown in the flowchart of FIG. 4, it is determined that there is inconsistency between the index value P_RMAX and the set value P_CMAX when the state in which the difference D exceeds the threshold continues for a predetermined period. Note that the inconsistency determination procedure using the PHR can be varied to other examples than those shown in FIGS. 3 and 4. For example, it may be varied so as to perform threshold determination to the moving average of the difference D.

Figure 5:
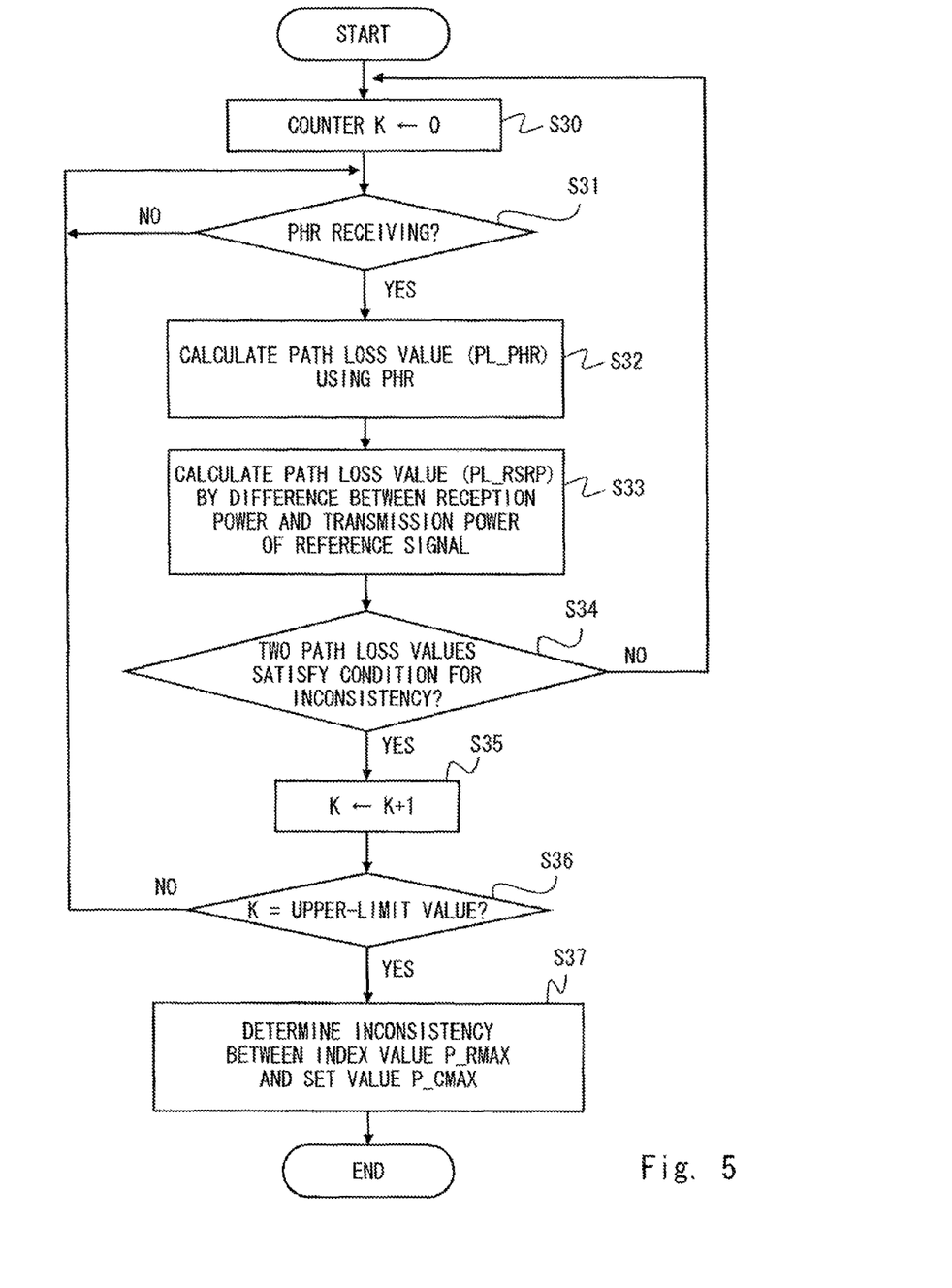
FIG. 5 is a flowchart showing one example of a procedure for determining inconsistency between a set value P_CMAX and an index value P_RMAX for scheduling of a maximum transmission power of a mobile station.

Shown in FIGS. 4 and 5 are procedures for determining the inconsistency between the index value P_RMAX and the set value P_CMAX by detecting the inconsistency between the expectation value V1 of the transmission power margin of the mobile station 13 and the real value V2 obtained based on the PHR. However, the parameter that can be used here is not limited to the transmission power margin. For example, the path loss between the base station 10 and the mobile station 13 can be used. This is because the UE of the LTE uses the estimation value of the downlink path loss to calculate the power headroom (i.e. transmission power margin). The following formula (1) is a definition expression of the power headroom specified in the specifications of the LTE.

$$PH(i) = P\_CMUX - \{10 \log_{10}(M_{PUSCH}(i)) + P_{O\_PUSCH}(j) + \alpha \cdot PL + \Delta_{TF}(i) + f(i)\} \, [dB] \quad (1)$$

In formula (1), the index "i" indicates the i-th subframe number. Further, $M_{PUSCH(i)}$ is the transmission bandwidth of PUSCH of the i-th subframe shown by the number of allocations of resource blocks. Further, $P_{O\_PUSCH}(i)$, $\alpha$, $\Delta_{TF}(i)$, and $f(i)$ are values used to determine the PUSCH transmission power of the i-th subframe, and are calculated by use of the value specific to the cell formed by the base station 10 and the value specific to the mobile station 13. See the section 5.1 "Uplink Power Control" of Non-patent literature 2 (3GPP TS 36.213 V8.5.0) for the detail of the definition expression of the power headroom.

Accordingly, the base station 10 is able to obtain the calculation value (PL_PHR) of the path loss of the downlink according to the following formula (2) using the value of the power headroom specified by the PHR received from the mobile station 13. Formula (2) can be obtained by converting formula (1) regarding PL. Note that PH(i) in formula (2) is a value of the power headroom notified from the PHR.

$$PL\_PHR = \frac{P\_RMUX}{\alpha} - \left\{ \frac{PH(i) + 10\log_{10}(M_{PUSCH}(i))}{\alpha} + \frac{P_{O\_PUSCH}(j) + \Delta_{TF}(i) + f(i)}{\alpha} \right\} [dB] \quad (2)$$

Further, as shown in formula (3), the base station 10 can obtain the calculation value of the path loss (PL_RSRP) also by subtracting the received power of the downlink reference signal in the mobile station 13 (RSRP: Reference Signal Received Power) from the transmission power of the downlink reference signal. The base station 10 may receive the RSRP measured by the mobile station 13. Further, the base station 10 may receive the reference signal received quality (RSRQ) from the mobile station 13, and calculate the path loss using the RSRQ.

$$PL\_RSRP = \text{reference signal power} - RSRP \, [dB] \quad (3)$$

The base station 10 may determine inconsistency between the index value P_RMAX and the set value P_CMAX by detecting the inconsistency between the path loss value (PL_PHR) that is calculated using the received value of the PHR and the path loss value. (PL_RSRP) that is calculated using the transmission power of the downlink reference signal and the received power measured by the mobile station 13.

FIG. 5 is a flowchart showing one example of the procedure for determining inconsistency between the index value P_RMAX and the set value P_CMAX by detecting the inconsistency between the calculation values of the path loss. In step S30, the value of the counter K is reset to zero. In step S31, it is determined whether the PHR is received from the mobile station 13. When the PHR is received (YES in step S31), the determination unit 105 calculates the path loss value (PL_PHR) using the PHR according to the formula (2) above (step S32). In step S33, the determination unit 105 calculates the path loss value (PL_RSRP) according to the formula (3) above.

In step S34, the determination unit 105 determines whether the two path loss values PL_PHR and PL_RSRP satisfy the predetermined condition for inconsistency. This can be achieved by performing threshold determination on the difference between two values, as is similar to steps S12 and S13 stated above. Steps S35 to S37 are similar to steps S26 to S28 stated above, and thus description will be omitted.

Described next is a procedure for determining the inconsistency between the set value P_CMAX and the index value P_RMAX based on the reception quality of the uplink signal. Specifically, the determination unit 105 compares an expectation value V3 of the reception quality of the uplink signal expected from the scheduling result of the uplink radio resource with a measurement value V4 of the reception quality obtained by analyzing the uplink signal actually received from the mobile station 13.

Figure 6:
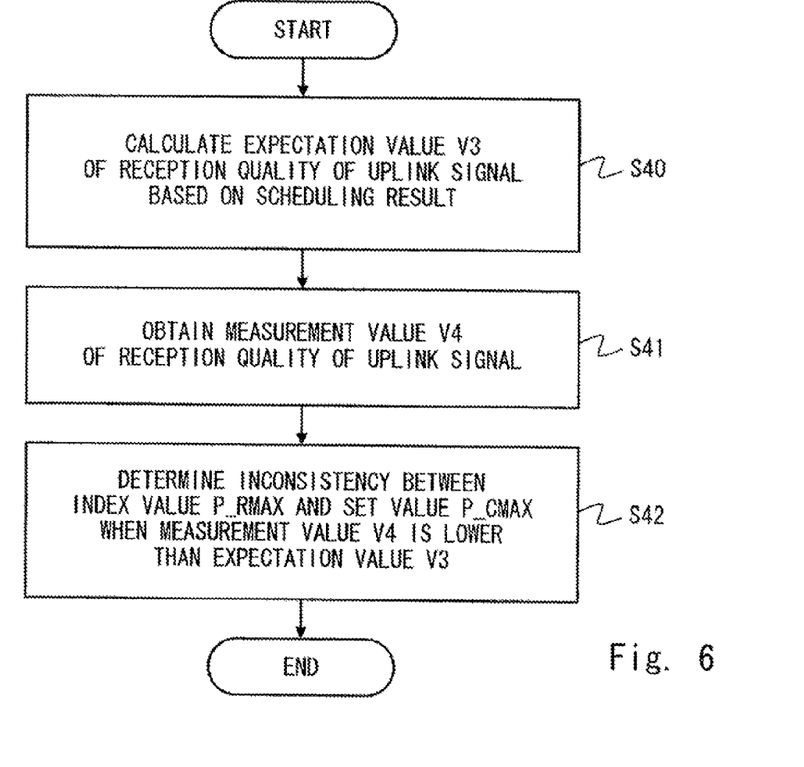
FIG. 6 is a flowchart showing one example of a procedure for determining inconsistency between a set value P_CMAX and an index value P_RMAX for scheduling of a maximum transmission power of a mobile station.

FIG. 6 is a flowchart showing a specific example of the procedure for detecting the inconsistency based on the reception quality of the uplink signal. In step S40, the determination unit 105 calculates the expectation value V3 based on the scheduling result of the uplink radio resources. In step S41, the determination unit 105 obtains the measurement value V4 of the reception quality of the uplink signal. When the reception quality indicated by the measurement value V4 is lower than that indicated by the expectation value V3, the determination unit 105 determines that there is inconsistency between the index value P_RMAX of the maximum transmission power for scheduling and the set value P_CMAX of the maximum transmission power actually set in the mobile station 13 (step S42).

Specific examples of the reception quality of the uplink signal that can be referred to by the determination unit 105 include (a) throughput of the uplink signal, (b) received power of the uplink signal in the base station 10, (c) received signal to interference ratio (SIR) of the uplink signal, (d) occupied bandwidth of the uplink signal, (e) the number of resource blocks used for carrying the uplink signal, and (f) a block error rate (BLER) obtained by decoding the uplink signal.

Specific Example (a)

Throughput of Uplink Signal

When referring to throughput of the uplink signal, the determination unit 105 may determine inconsistency between the index value P_RMAX and the set value P_CMAX if the measurement value of the throughput is smaller than the expectation value by a predetermined threshold or more.

In such a case, the determination unit 105 may calculate the throughput (expectation value V3) of the received data sequence restored from the uplink signal based on the transport format (modulation scheme or the like) and the number of resource blocks allocated for the uplink transmission. The determination unit 105 may further acquire the throughput (measurement value V4) of the received data sequence restored from the uplink signal from the communication data processing unit 102.

Specific Example (b)

Received Power of Uplink Signal

When referring to the received power of the uplink signal, the determination unit 105 may determine inconsistency between the index value P_RMAX and the set value P_CMAX if the measurement value of the received power is smaller than the expectation value by a predetermined threshold or more.

In such a case, the determination unit 105 may calculate the received power (expectation value V3) from the uplink path loss estimation value, the transmission power of the mobile station calculated based on the number of resource blocks allocated by scheduling, and the index value P_RMAX. The determination unit 105 may further acquire the received power in the frequency band specified by the successive resource blocks allocated to the mobile station 13 by scheduling from the radio transmitting/receiving unit 101.

Specific Example (c)

Received SIR of Uplink Signal

When referring to the received SIR of the uplink signal, the determination unit 105 may determine inconsistency between the index value P_RMAX and the set value P_CMAX if the measurement value of the received SIR is smaller than the expectation value by a predetermined threshold or more.

In such a case, the determination unit 105 may calculate the received SIR (expectation value V3) from the uplink path loss estimation value, the transmission power of the mobile station calculated based on the number of resource blocks allocated by scheduling, and the index value P_RMAX. The determination unit 105 may further acquire the received SIR in the frequency band specified by the successive resource blocks allocated to the mobile station 13 by scheduling from the radio transmitting/receiving unit 101.

Specific Example (d) and (e)

Occupied Bandwidth of Uplink Signal (the Number of Resource Blocks)

When referring to the occupied bandwidth (the number of resource blocks) of the uplink signal, the determination unit 105 may determine inconsistency between the index value P_RMAX and the set value P_CMAX if the number of resource blocks that are used of the received uplink signal is smaller than the expectation value.

In such a case, the determination unit 105 may set the number of resource blocks allocated by scheduling as the expectation value V3. The determination unit 105 may further acquire the number of resource blocks (measurement value V4) used in the uplink signal that is received from the communication data processing unit 102.

Specific Example (f)

Block Error Rate (BLER) of Uplink Signal

When referring to BLER, the determination unit 105 may determine inconsistency between the index value P_RMAX and the set value P_CMAX if the measurement value of BLER is larger than the expectation value by a predetermined threshold or more.

In such a case, the determination unit 105 may set the target value of BLER on which the scheduling unit 104 is based as the expectation value V3 in consideration of radio wave environment or the like. The determination unit 105 may further acquire the BLER (measurement value V4) obtained at the time of error-correcting code from the communication data processing unit 102.

Described next is a procedure for determining inconsistency between the set value P_CMAX and the index value P_RMAX based on the radio modulation scheme used in the uplink signal. The modulation scheme having larger distance between signal points on the constellation requires smaller carrier to noise ratio (CNR) (which means high tolerance for noise). Thus, the mobile station 13 adaptively changes the modulation scheme (from 64 QAM to 16 QAM, for example) when the transmission power cannot be increased. Accordingly, it is possible to determine the inconsistency between the index value P_RMAX and the set value P_CMAX by referring to the radio modulation scheme employed in the uplink signal.

Figure 7:
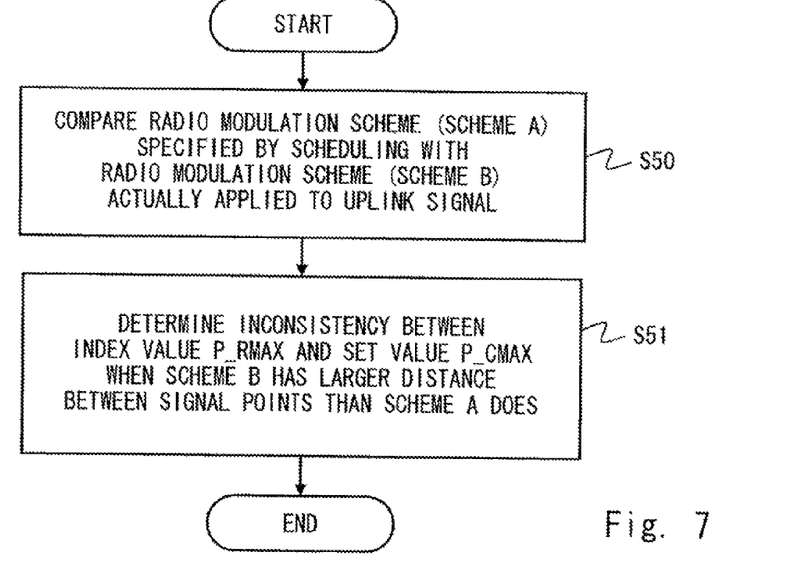
FIG. 7 is a flowchart showing one example of a procedure for determining inconsistency between a set value P_CMAX and an index value P_RMAX for scheduling of a maximum transmission power of a mobile station.

FIG. 7 is a flowchart showing a specific example of a procedure for detecting inconsistency based on the radio modulation scheme of the uplink signal. In step S50, the determination unit 105 compares the radio modulation scheme (called scheme A) of the uplink signal specified by the scheduling with the radio modulation scheme (called scheme B) actually applied to the uplink signal. Then, the determination unit 105 determines the inconsistency between the index value P_RMAX and the set value P_CMAX when the scheme B has a larger distance between signal points on the constellation than the scheme A does (step S51).

As described above, the base station 10 according to the first exemplary embodiment is able to determine the inconsistency between the index value P_RMAX and the set value P_CMAX without receiving the transmission power upper-limit value P_UMAX associated with the power class of the mobile station 13 from the mobile station 13.

Second Exemplary Embodiment

Figure 8:
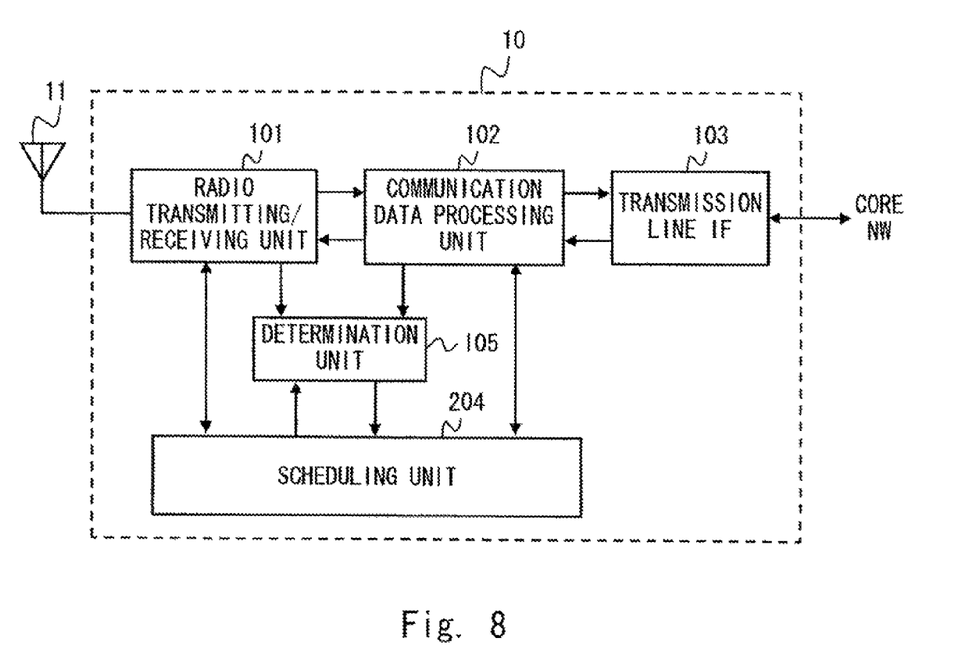
FIG. 8 is a diagram showing a configuration example of a base station according to a second exemplary embodiment of the present invention.

A base station 20 according to a second exemplary embodiment determines inconsistency between an index value P_RMAX and a set value P_CMAX, as is similar to the base station 10 described above. Further, the base station 20 updates the index value P_RMAX so as to make the index value P_RMAX approach the set value P_CMAX when the inconsistency between the index value P_RMAX and the set value P_CMAX is determined. The base station 20 further performs scheduling of uplink radio resources using the updated index value P_RMAX.

FIG. 8 is a block diagram showing a configuration example of the base station 20. The difference from the configuration example of the base station 10 shown in FIG. 2 is that a scheduling unit 204 updates the index value P_RMAX stated above. Since other components than the scheduling unit 204 are similar to those shown in FIG. 2, the overlapping descriptions are omitted here.

Figure 9:
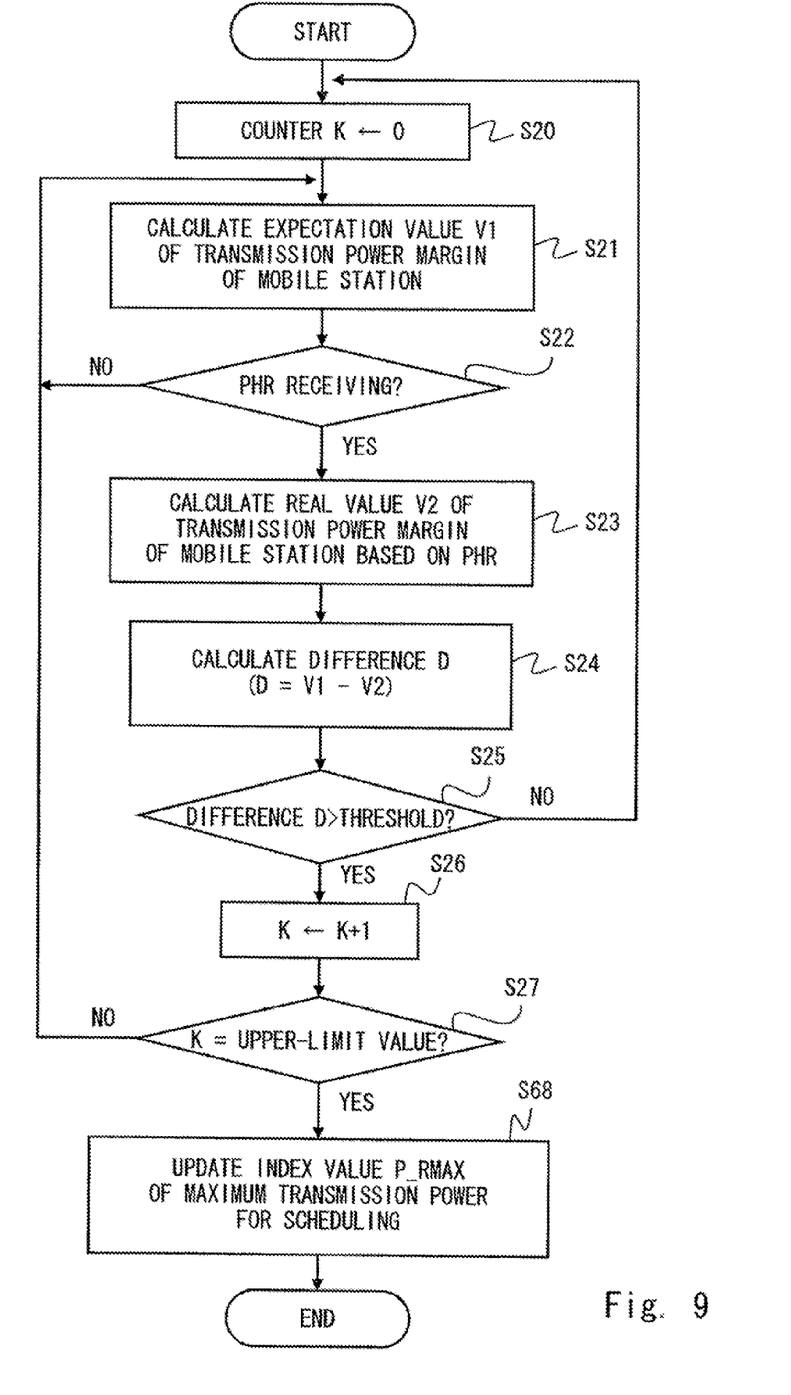
FIG. 9 is a flowchart showing one example of a procedure for updating an index value P_RMAX for scheduling.

In the following description, a specific example of an operation of updating the index value P_RMAX will be described. FIG. 9 is a flowchart showing a series of procedures including the determination of inconsistency by the determination unit 105 and the following update processing. Steps S21 to S27 in FIG. 9 are similar to corresponding steps shown in FIG. 4. Note that other procedures (procedure shown in FIG. 3, 5, 6, or 7, for example) may be employed as a procedure for determining the inconsistency by the determination unit 105 according to the second exemplary embodiment.

In step S68 shown in FIG. 9, the scheduling unit 204 updates the index value P_RMAX of the maximum transmission power for scheduling in response to the detection of inconsistency in the determination unit 105. Various methods for updating the index value P_RMAX may be possible. Some of the examples will be listed in the following (a) to (e):
(a) gradually changing the index value P_RMAX from a larger power value to a smaller power value of transmission power values associated with power classes of the mobile station, defined in the standard specification of LTE;
(b) gradually decreasing the index value P_RMAX from the initial value P_RMAX by a certain value according to the repeated determination of inconsistency;
(c) decreasing the index value P_RMAX by the value of the difference D;
(d) obtaining an average value of the difference D over a duration period in a state in which the difference D exceeds the threshold, and decreasing the index value P_RMAX by the average value of the difference D, e.g., obtaining the average value among the calculation values of the difference D corresponding to the number of upper-limit values of the counter K.
(e) obtaining an average value of the difference D over a duration period in a state in which the difference D exceeds the threshold, and decreasing the index value P_RMAX by a predetermined ratio of the average value of the difference D.

Figure 10:
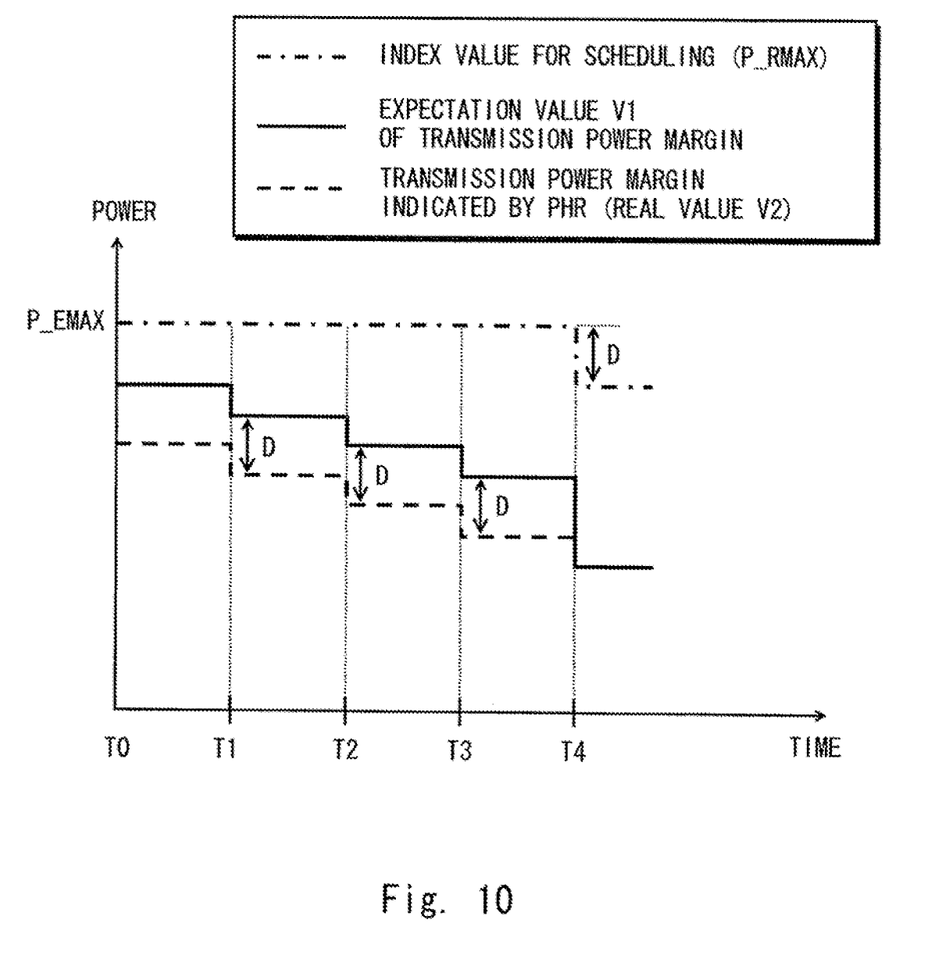
FIG. 10 is a graph showing a state in which the index value P_RMAX for scheduling is updated.

FIG. 10 is a graph showing a state in which the index value P_RMAX is updated. The graph shown by an alternate long and short dash line in FIG. 10 indicates the index value P_RMAX of the maximum transmission power for scheduling. As stated above, the initial value (time T0) of the index value P_RMAX is an allowable value P_EMAX notified to the mobile station by the base station 10. The graph shown by a solid line in FIG. 10 indicates the expectation value V1 of the transmission power margin of the mobile station 13 calculated using the index value P_RMAX. Last, a graph shown by a dashed line in FIG. 10 indicates the real value V2 of the margin of the transmission power of the mobile station 13 indicated by the PHR.

In the example of FIG. 10, the PHR is regularly reported from the mobile station 13 in the order of time T1, T2, T3, T4, and the determination unit 105 determines the threshold for the difference D every time the PHR is received. Further, it is assumed that the upper-limit value of the counter K is set to 3. In this case, according to the fact that the difference D exceeds a predetermined threshold in any of four times of determinations at time T1 to T4, the scheduling unit 204 updates the index value P_RMAX of the maximum transmission power. In the example shown in FIG. 10, the index value P_RMAX after updating is generated by decreasing the index value P_RMAX before updating by the value of the difference D.

As described above, as is similar to the base station 10 described above, the base station 20 according to the second exemplary embodiment is able to determine the inconsistency between the index value P_RMAX and the set value P_CMAX without receiving the transmission power upper-limit value P_UMAX associated with the power class of the mobile station 13 from the mobile station 13.

Furthermore, when inconsistency between the index value P_RMAX and the set value P_CMAX is determined, the base station 20 updates the index value P_RMAX to make the index value P_RMAX approach the set value P_CMAX. Accordingly, the scheduling of the uplink radio resources can be performed using the index value P_RMAX closer to the maximum transmission power P_CMAX actually set in the mobile station 13. Accordingly, unnecessary allocation of resources is suppressed, and efficient scheduling can be achieved.

Other Exemplary Embodiments

Described in the above first and second exemplary embodiments of the present invention is a radio communication system and a base station of LTE type. However, the configuration and the operations for detecting inconsistency between the index value P_RMAX and the set value P_CMAX and updating the index value P_RMAX described in the first and second exemplary embodiments of the present invention can be applied to other systems than the LTE.

The operations regarding detection of the inconsistency between the index value P_RMAX and the set value P_CMAX and the update of the index value P_RMAX described in the first and second exemplary embodiments of the present invention may be achieved by a computer system including an application specific integrated circuit (ASIC), a digital signal processor (DSP), a micro processing unit (MPU) or a central processing unit (CPU), or a combination thereof. Specifically, it is possible to cause a computer system to execute a program including an instruction group regarding processing procedures shown in a flowchart of any of FIG. 3 to 7 or 9. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM, etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Furthermore, the present invention is not limited to the exemplary embodiments described above, but may be variously changed without departing from the spirit of the present invention that has already been described.

This application claims the benefit of priority, and incorporates herein by reference in its entirety, the following Japanese Patent Application No. 2009-108960 filed on Apr. 28, 2009.

REFERENCE SIGNS LIST

1 RADIO COMMUNICATION SYSTEM
10, 20 BASE STATION
11 ANTENNA
12 COVERAGE AREA
13 MOBILE STATION
101 RADIO TRANSMITTING/RECEIVING UNIT
102 COMMUNICATION DATA PROCESSING UNIT
103 TRANSMISSION LINE INTERFACE
104, 204 SCHEDULING UNIT

The invention claimed is:

1. A base station apparatus that receives an uplink signal transmitted from a mobile station, comprising: hardware, including a processor; a determination unit implemented at least by the hardware and adapted to determine, based on at least one of reception quality of the uplink signal, a radio modulation scheme applied to the uplink signal, and notification information from the mobile station included in the uplink signal, inconsistency between a set value of a maximum transmission power which the mobile station actually imposes on the mobile station itself and an index value which is related to the maximum transmission power of the mobile station and is used in the base station apparatus for scheduling of a radio resource carrying the uplink signal without the mobile station reporting a transmission power upper-limit value associated with a power class of the mobile station, the notification information not including the transmission power upper-limit value, smaller one of the index value and the transmission power upper-limit value being set by the mobile station as the set value.

2. The base station apparatus according to claim 1, further comprising a scheduling unit adapted to update the index value so as to make the index value approach the set value according to the determination of the inconsistency and to perform the scheduling using the index value that is updated.

3. The base station apparatus according to claim 1, wherein the notification information comprises information regarding a transmission power margin value defined by a difference between the set value and transmission power of the mobile station.

4. The base station apparatus according to claim 2, wherein the notification information comprises information regarding a transmission power margin value defined by a difference between the set value and transmission power of the mobile station, and
the scheduling unit determines the index value after updating according to a difference between the transmission power margin value indicated by the notification information and an expectation value of a transmission power margin of the mobile station calculated based on the index value before updating and the radio resource allocated to the mobile station.

5. The base station apparatus according to claim 1, wherein the determination unit compares an expectation value of the reception quality of the uplink signal expected from a result of the scheduling with a measurement value of the reception quality obtained by analyzing the uplink signal that is received, to determine the inconsistency.

6. The base station apparatus according to claim 5, wherein the reception quality of the uplink signal includes at least one of (a) throughput of the uplink signal, (b) received power in the base station of the uplink signal, (c) a received signal to interference ratio (SIR) of the uplink signal, (d) occupied bandwidth of the uplink signal, (e) the number of radio resource elements used to carry the uplink signal, and (f) an error rate obtained by decoding the uplink signal.

7. The base station apparatus according to claim 1, wherein the determination unit compares a radio modulation scheme specified to the uplink signal in the scheduling with a radio modulation scheme actually applied to the uplink signal that is received, to determine the inconsistency.

8. The base station apparatus according to claim 2, wherein the scheduling unit gradually changes the index value from a larger power value to a smaller power value among transmission power values associated with power classes according to the repeated determination of the inconsistency.

9. A radio communication system comprising:
a mobile station; and
a base station configured to perform scheduling of a radio resource used to transmit an uplink signal from the mobile station and to receive the uplink signal transmitted according to the scheduling, wherein
the base station comprises a determination unit adapted to determine, based on at least one of reception quality of the uplink signal, a radio modulation scheme applied to the uplink signal, and notification information from the mobile station included in the uplink signal, inconsistency between a set value of a maximum transmission power which the mobile station actually imposes on the mobile station itself and an index value which is related to the maximum transmission power of the mobile station and is used for the scheduling without the mobile station reporting transmission power upper-limit value associated with a power class of the mobile station, the notification information not including the transmission power upper-limit value, smaller one of the index value and the transmission power upper-limit value being set by the mobile station as the set value.

10. The radio communication system according to claim 9, further comprising a scheduling unit adapted to update the index value so as to make the index value approach the set value according to the determination of the inconsistency and to perform the scheduling using the index value that is updated.

11. The radio communication system according to claim 9, wherein the notification information comprises information regarding a transmission power margin value defined by a difference between the set value and transmission power of the mobile station.

12. The radio communication system according to claim 10, wherein
the notification information comprises information regarding a transmission power margin value defined by a difference between the set value and transmission power of the mobile station, and
the scheduling unit determines the index value after updating according to a difference between the transmission power margin value indicated by the notification information and an expectation value of a transmission power margin of the mobile station calculated based on the index value before updating and the radio resource allocated to the mobile station.

13. The radio communication system according to claim 9, wherein the determination unit compares an expectation value of the reception quality of the uplink signal expected from a result of the scheduling with a measurement value of the reception quality obtained by analyzing the uplink signal that is received, to determine the inconsistency.

14. The radio communication system according to claim 13, wherein the reception quality of the uplink signal includes at least one of (a) throughput of the uplink signal, (b) received power in the base station of the uplink signal, (c) a received signal to interference ratio (SIR) of the uplink signal, (d) occupied bandwidth of the uplink signal, (e) the number of radio resource elements used to carry the uplink signal, and (f) an error rate obtained by decoding the uplink signal.

15. The radio communication system according to claim 9, wherein the determination unit compares a radio modulation scheme specified to the uplink signal in the scheduling with a radio modulation scheme actually applied to the uplink signal that is received, to determine the inconsistency.

16. The radio communication system according to claim 10, wherein the scheduling unit gradually changes the index value from a larger power value to a smaller power value among transmission power values associated with power classes according to the repeated determination of the inconsistency.

17. A control method of a base station apparatus that receives an uplink signal transmitted from a mobile station, the method comprising:

determining, based on at least one of reception quality of the uplink signal, a radio modulation scheme applied to the uplink signal, and notification information from the mobile station included in the uplink signal, inconsistency between a set value of a maximum transmission power which the mobile station actually imposes on the mobile station itself and an index value which is related to the maximum transmission power of the mobile station and is used in the base station apparatus for scheduling of a radio resource carrying the uplink signal without the mobile station reporting a transmission power upper-limit value associated with a power class of the mobile station, the notification information not including the transmission power upper-limit value, smaller one of the index value and the transmission power upper-limit value being set by the mobile station as the set value.

18. A control method of a radio communication system comprising:

notifying a scheduling result of a radio resource used to carry an uplink signal to a mobile station from a base station;

transmitting the uplink signal from the mobile station to the base station based on the scheduling result; and determining, in the base station, based on at least one of reception quality of the uplink signal, a radio modulation scheme applied to the uplink signal, and notification information from the mobile station included in the uplink signal, inconsistency between a set value of a maximum transmission power which the mobile station actually imposes on the mobile station itself and an index value which is related to the maximum transmission power of the mobile station and is used for the scheduling without the mobile station reporting a transmission power upper-limit value associated with a power class of the mobile station, the notification information not including the transmission power upper-limit value, smaller one of the index value and the transmission power upper-limit value being set by the mobile station as the set value.

* * * * *